United States Patent
Iizuka

(10) Patent No.: US 6,417,953 B1
(45) Date of Patent: Jul. 9, 2002

(54) LASER OPTICAL SYSTEM

(75) Inventor: Takashi Iizuka, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/612,500

(22) Filed: Jul. 7, 2000

(30) Foreign Application Priority Data

Jul. 9, 1999 (JP) .......................................... 11-196439

(51) Int. Cl.⁷ .............................. G02F 1/33; G02F 1/11
(52) U.S. Cl. ...................... 359/305; 359/285; 250/235; 250/578.1
(58) Field of Search ................................ 359/305, 285, 359/286, 287, 618, 583, 237; 250/235, 578.1

(56) References Cited

U.S. PATENT DOCUMENTS 6,011,256 A * 1/2000 Takada ........................ 250/235
6,118,574 A * 9/2000 Imanishi et al. ............. 359/305
6,172,799 B1 * 1/2001 Raj ............................. 359/305

OTHER PUBLICATIONS

"The Facts on File Dictionary of Physics" Copyright © 1981 and 1988 by Charles Letts & Co., Ltd.

* cited by examiner

Primary Examiner—Loha Ben
(74) Attorney, Agent, or Firm—Greenblum & Bernstein P.L.C.

(57) ABSTRACT

Disclosed is a laser optical system including a multiline laser source that emits a laser beam having a plurality of peak wavelengths, a wavelength separating optical system that separates the laser beam emitted from the laser source into two monochromatic beams, a pair of modulating optical systems that modulate intensities of the monochromatic beams, a beam combining optical system that combines the laser beams modulated by the modulating optical systems, a deflector for deflecting a plurality of laser beam combined by the beam combining optical system, and a converging optical system that converges the laser beams deflected by the deflector to form beam spots on an object surface to be exposed. The modulating optical systems, which include diffractive beam-dividing elements, are optimized for the respective monochromatic beams to form the beam spots at the identical pitches on the object surface.

10 Claims, 2 Drawing Sheets

LASER OPTICAL SYSTEM

BACKGROUND OF THE INVENTION

Figure 1:
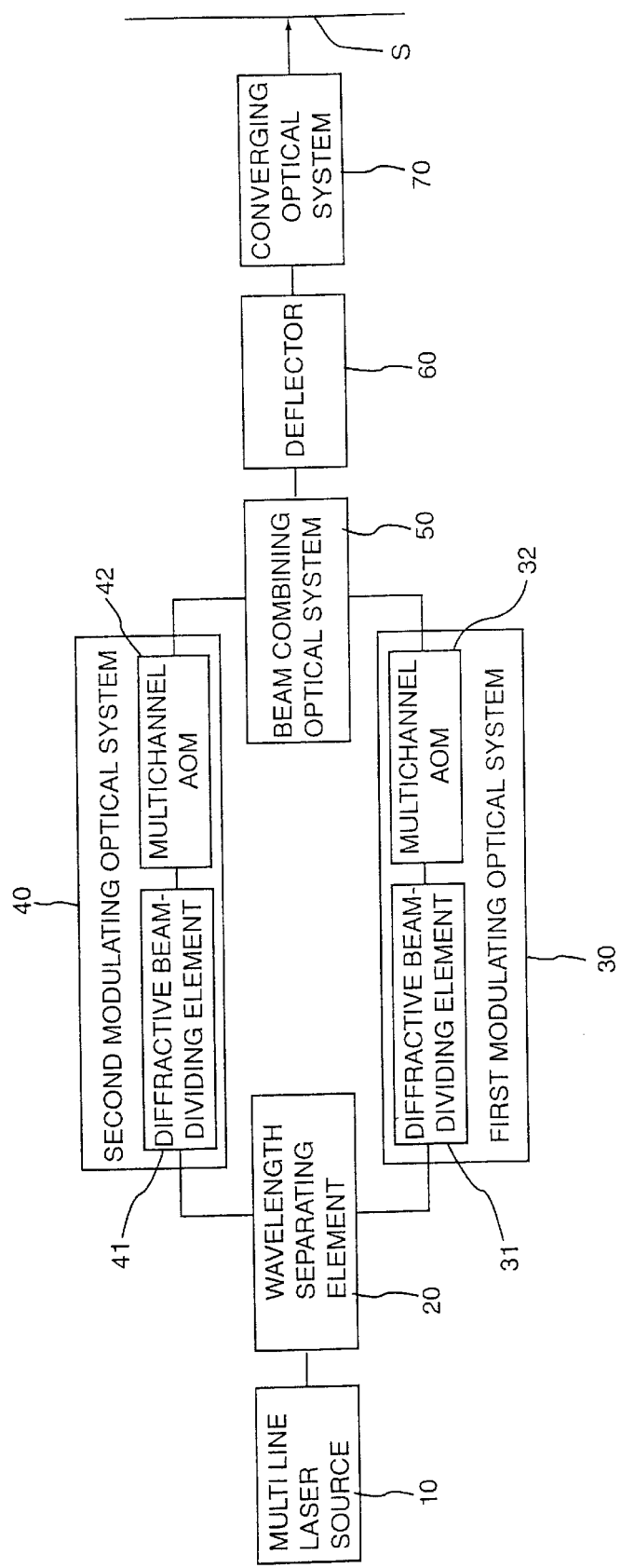

The present invention relates to a laser optical system that includes a laser source that emits a laser beam of a plurality of wavelengths (i.e., a multiline laser). Particularly, the present invention relates to a laser optical system used in an exposure device such as a laser photo plotter that plots a pattern on a photosensitive surface by scanning a single beam spot or a plurality of beam spots formed thereon.

The exposure device such as a laser photo plotter, which requires relatively large laser power, employs a gas laser. A gas laser generally emits a laser beam having a plurality of peak wavelengths. For example, an argon laser emits a laser beam having a plurality of peak wavelengths in ultraviolet and visible regions.

In such an exposure device, it is desirable to increase plotting speed to increase productivity. In order to increase the plotting speed, it is necessary to increase scanning velocity or it is necessary to divide a laser beam to form a plurality of beam spots on an object surface to be exposed, which requires large laser power to maintain a predetermined light amount of the single beam spot.

Therefore, it is desirable to use a plurality of peak wavelengths of a laser beam emitted from a gas laser to keep the large laser power. Particularly, the exposure device used for manufacturing a printed circuit board (PCB) or a semiconductor device has higher requirement in using a plurality of wavelengths. Because, although the fine circuit pattern requires a high resolution with short wavelength laser beam such as ultraviolet beam, luminous efficiency of the gas laser in ultraviolet region is lower than that in the visible region, a single peak wavelength in the ultraviolet region may not supply sufficient laser power for the high speed plotting.

However, when a plurality of wavelengths are used in the optical system that is not corrected in lateral chromatic aberration, a convergent point of one peak wavelength is slightly deviated from convergent points of other peak wavelengths on the photosensitive surface. This enlarges the diameter of the resultant beam spot, thereby lowering the plotting performance of the exposure device.

Particularly, when a plurality of wavelengths are used in the optical system that includes a diffractive element instead of or additional to conventional refractive elements, the plotting performance of the exposure device would be seriously lowered because of larger wavelength dependence of the diffractive element. The diffractive element may be an acoustooptic modulator (AOM), a diffractive beam-dividing element, or the like.

Therefore, the conventional optical system that employs a gas laser and a diffractive element, is provided with a filter that selects one peak wavelength. The filter cuts the peak wavelengths other than the selected peak wavelength, which lowers energy efficiency.

SUMMARY OF THE INVENTION

It is therefore an object of the present invention to provide a laser optical system including a multiline laser source and a diffractive element such as an AOM or a diffractive beam-dividing element, which is capable of increasing energy efficiency while keeping the plotting performance.

For the above object, according to the present invention, there is provided an improved laser optical system, which separates a laser beam emitted from a multiline laser source into monochromatic beams by a wavelength separating element. The laser optical system modulates intensity of the respective monochromatic beams by respective modulating optical systems that include diffractive elements, and then combines the modulated monochromatic beams by a beam combining optical system. The combined monochromatic laser beams may form a common beam spot or separate beam spots on an object surface to be exposed.

With this construction, since each modulating optical system treats a monochromatic beam, chromatic aberration due to the wavelength dependence of the diffractive element presents no problem. As a result, when the laser optical system is provided with a pair of the modulating optical systems for example, two peak wavelengths of a laser can be used, which increases the energy efficiency. Further, when the modulating optical systems are optimized for the respective wavelengths, the resultant beam spot can be kept small even if the combined monochromatic beams form a common beam spot on the object surface, which keeps a high plotting performance.

The modulator may be an acoustooptic modulator (AOM) that changes a direction of an emergent beam by diffraction caused by input ultrasonic wave. Either a diffracted beam or a non-diffracted beam emerges from the modulator as a modulated beam to form the beam spot on the object surface. In this case, the modulator itself comprises the diffractive element. The diffractive element may be the modulator or an element included in addition to the modulator.

Further, the modulating optical system may include a diffractive beam-dividing element that divides the incident monochromatic beam into a plurality of separate beams. In this case, the modulator should be a multichannel modulator, which may be an AOM or other modulator. It is desirable that the incident beam on the diffractive beam-dividing element is a parallel beam, while the channels of the multichannel modulator should be located at convergent points of laser beams. Therefore, a condenser lens or a condenser mirror is required to be located between the diffractive beam-dividing element and the multichannel modulator.

When the modulating optical systems include the diffractive beam-dividing elements, each of the monochromatic beams forms a plurality of beam spots on the object surface. In this case, the beam spots of one monochromatic beam may be overlapped with corresponding beam spots of other monochromatic beams to form common beam spots on the object surface. On the other hand, all of the beam spots may be separated from one another.

To overlap the beam spots of different wavelengths (i.e., to overlap the beam spots emerged from different modulating optical systems), pitches of the beam spots of respective wavelengths must be identical to form common beam spots. Further, even if the respective monochromatic beams form separate beam spots, it would be desirable that pitches of the beam spots of respective wavelengths are identical. There are at least two ways to keep the identical pitches of the beam spots.

In the first way, the relationship among the grating pitches of the diffractive beam-dividing elements of the respective modulating optical systems are determined such that the grating pitch is proportional to the wavelength. In the first way, the focal lengths of the condenser lenses are identical.

In the second way, the relationship among the focal lengths of the condenser lenses of the respective modulating optical systems are determined such that the focal length is inversely proportional to the wavelength. In the second way, the grating pitches are identical.

Further, when the respective monochromatic beams form separate beam spots, the beam spots of respective wavelengths are preferably alternately aligned along a straight line. Namely, it is desirable that all of the beam spots are arranged along a straight line in such a fashion that one beam spot of one wavelength is positioned next to one beam spot of another wavelength.

The wavelength separating element may separate the laser beam from the multiline laser source into two beams of different wavelengths. In such a case, a pair of modulating optical systems should be provided and the beam combining optical system may be a polarizing beam splitter. When the polarizing beam splitter is used, the laser beam modulated by one modulating optical system should be incident on the polarizing beam splitter as S-polarized light and the laser beam modulated by the other modulating optical system should be incident as P-polarized light.

Still further, the laser optical system of the embodiment includes a deflector for deflecting a plurality of laser beams combined by the beam combining optical system, and a converging optical system that converges the laser beams deflected by the deflector to form beam spots on the object surface.

DESCRIPTION OF THE ACCOMPANYING DRAWINGS

Figure 2:
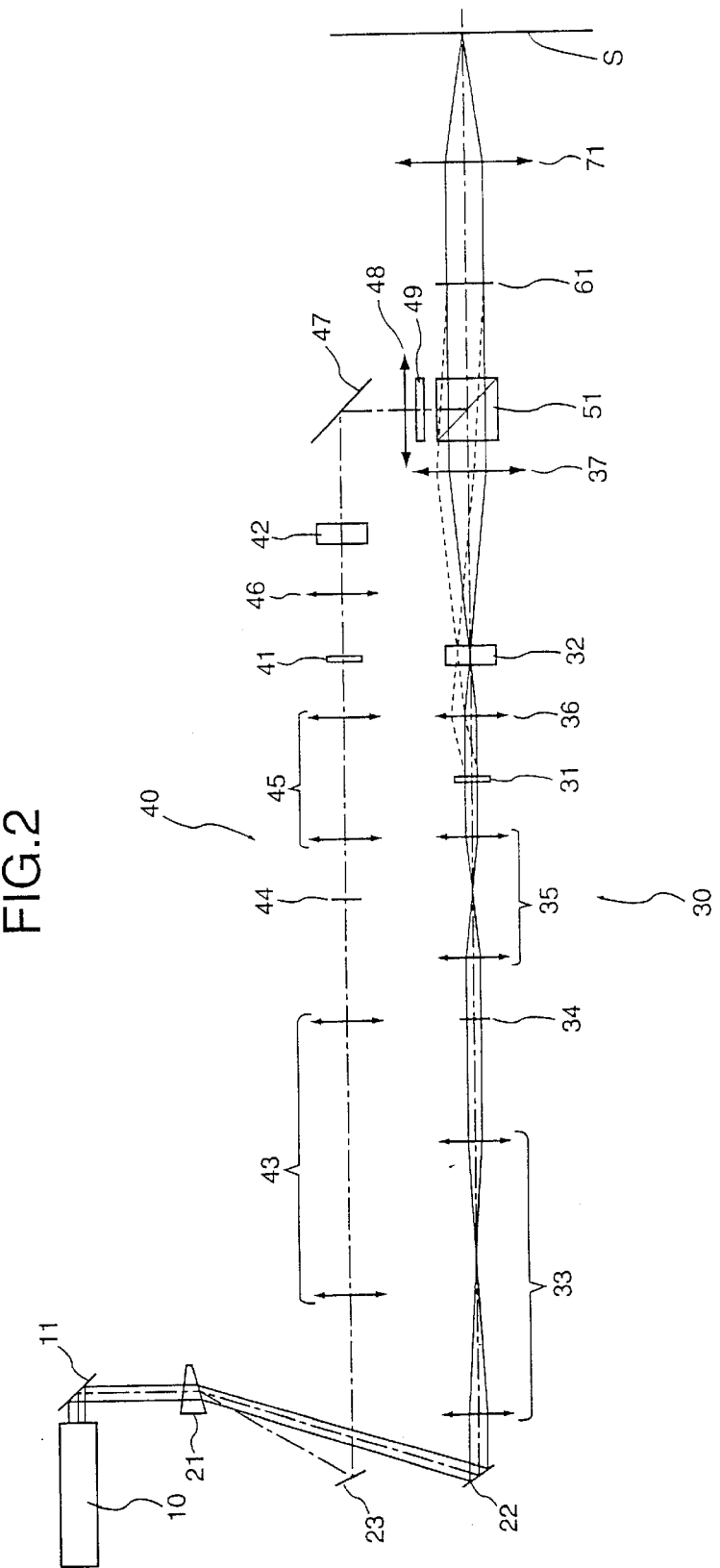

FIG. 1 is a block diagram of a scanning optical system to which the laser optical system embodying the invention is applied; and FIG. 2 shows an optical path of an example of the scanning optical system shown in FIG. 1.

DESCRIPTION OF THE EMBODIMENTS

An embodiment of the laser optical system according to the present invention will be described with reference to the drawings. FIG. 1 is a block diagram of a scanning optical system to which an embodiment of the present invention is applied, FIG. 2 shows an optical path of an example of the scanning optical system shown in FIG. 1. First, an outline of the embodiment will be described with reference to FIG. 1.

The scanning optical system of the embodiment includes, as shown in FIG. 1, a multiline laser source 10 that emits a laser beam having a plurality of peak wavelengths, a wavelength separating element 20 that separates the laser beam emitted from the laser source 10 into a plurality of monochromatic beams of different wavelengths (first and second monochromatic beams in this embodiment), a pair of modulating optical systems 30 and 40 that modulate intensities of the respective monochromatic beams, a beam combining optical system 50 that combines the monochromatic beams modulated by the modulating optical systems 30 and 40, a deflector 60 for deflecting a plurality of combined laser beams, and a converging optical system 70 that converges the laser beams deflected by the deflector 60 to form beam spots on an object surface S to be exposed.

The first modulating optical system 30 includes a diffractive beam-dividing element 31 that divides the first monochromatic beam into a plurality of separate beams and a multichannel acoustooptic modulator (AOM) 32 that independently modulates intensity of the separate beams. In this case, the AOM 32 switches ON/OFF the separate beams. Similarly, the second modulating optical system 40 includes a diffractive beam-dividing element 41 and a multichannel AOM 42.

The diffractive beam-dividing element 31 (41) includes a transparent substrate made of a glass or transparent resin, and a diffractive grating formed on one surface of the transparent substrate. The diffractive grating has a plurality of identically formed belt-shaped phase patterns, which are arranged in parallel at equal pitch. The diffractive beam-dividing element 31 (41) diffracts the incident laser beam to be divided into a plurality of separate beams that emerge at different diffraction angles.

The AOM changes a direction of an emergent laser beam in response to the input ultrasonic wave. In the AOM, when the ultrasonic wave is applied to a medium, a diffraction grating is formed by a compression wave caused in the medium. One of the diffracted beam and the non-diffracted beam emerges as the modulated beam, and the other beam is cut off by a shading plate.

The multichannel AOM 32 (42) is provided with a plurality of channels on which the separated beams divided by the diffractive beam-dividing element 31 (41) are incident. The channels are independently controlled to independently modulate intensities of the separated beams, respectively.

The laser beam emitted from the laser source 10 is separated by the wavelength separating element 20 into the first and second monochromatic beams of different wavelengths. The monochromatic beams are incident on the modulating optical systems 30 and 40, respectively. The respective modulating optical systems 30 and 40 divide the monochromatic beams into a plurality of separate beams and modulate intensities of the separate beams. The modulated beams are combined by the beam combining optical system 50 and are deflected by the deflector 60. The deflected laser beams are converged by the converging optical system 70 to form a plurality of scanning beam spots on the object surface S.

In the specification, the scanning direction of the beam spots is defined as "a main scanning direction", and a direction perpendicular to the main scanning direction on the object surface S is defined as "an auxiliary scanning direction".

On the object surface S, a plurality of beam spots are aligned along a straight line that is angled with respect to both of the main scanning direction and the auxiliary scanning direction. Further, the modulating optical systems 30 and 40 are optimized for the respective monochromatic beams to form the beam spots at the identical pitches on the object surface S as described later.

The beam spots of the first monochromatic beam and the beam spots of the second monochromatic beam may be overlapped or separated. For example, when each of the diffractive beam-dividing elements 31 and 41 divides the respective monochromatic beams into eight separate beams, eight common beam spots may be formed or sixteen separate beam spots may be formed on the object surface S. In the former case, the corresponding channels of the multichannel AOM's 32 and 42 are controlled by the same control signals. In the latter case, the respective channels of the multichannel AOM's 32 and 42 are controlled by the different control signals.

Since the scanning optical system of the embodiment includes a pair of modulating optical systems 30 and 40 to use the laser beams of two wavelengths, i.e., each modulating optical system treats a monochromatic beam, chromatic aberration due to the wavelength dependence of the diffractive beam-dividing elements present no problem.

On the other hand, if the laser beams of two wavelengths are modulated by a single modulating optical system, the convergent point of the first wavelength on the object surface is slightly deviated from the convergent point of the second wavelength due to the wavelength dependence, which enlarges the resultant beam spot.

Next, an example of the above described scanning optical system will be described with reference to FIG. 2.

The laser source 10 is an argon laser that emits a laser beam having a plurality of peak wavelengths. The wavelength of the first monochromatic beam is 363.8 nm and the wavelength of the second monochromatic beam is 351.1 nm, in this example. The laser beam emitted from the laser source 10 and reflected by a mirror 11 is spatially separated into two monochromatic beams by means of a chromatic dispersion of a wedge prism 21 that corresponds to the wavelength separating element 20. The first monochromatic beam of the longer wavelength is refracted at a predetermined refraction angle and reflected by a mirror 22 to be incident on the first modulating optical system 30. On the other hand, the second monochromatic beam of the shorter wavelength is refracted at a larger refraction angle than that of the first monochromatic beam by the wedge prism 21 and reflected by a mirror 23 to be incident on the second modulating optical system 40.

The monochromatic beams emerged from the modulating optical systems 30 and 40 are combined by a polarizing beam splitter 51 as the beam combining optical system 50. The combined laser beams are reflected and deflected by a polygon mirror 61 as the deflector 60, and then the deflected beams are converged on the object surface S through an fθ lens 71 as the convergent optical system 70 to form a plurality of beam spots scanning in the main scanning direction.

The first modulating optical system 30 is provided with a first relay lens system 33 having a pair of positive lenses, a piezo mirror 34 for compensating facet error of the polygon mirror 61, a second relay lens system 35 having a pair of positive lenses, the diffractive beam-dividing element 31, a condenser lens 36, the multichannel AOM 32 and a collimator lens 37, arranged in this order from the mirror 22.

The first monochromatic beam reflected by the mirror 22 is adjusted in its diameter by the first and second relay lens systems 33 and 35, and the adjusted beam is incident on the diffractive beam-dividing element 31 as a parallel beam. The incident beam is divided into a plurality of beams that emerge at different diffraction angles. In FIG. 2, zero order diffraction beam (shown as a solid line) and first order diffraction beam (shown in a dotted line) are indicated, while the beam dividing element may divide the incident beam into three or more separate beams. The separate beams are condensed by the condenser lens 36 on the channels of the multichannel AOM 32 to be modulated. The channels are substantially located in the rear focal plane of the condenser lens 36.

The modulated divergent beams are collimated by the collimator lens 37 and incident on the polarizing beam splitter 51. The optical system from the laser source 10 to the first modulating optical system 30 is designed such that the emergent beams from the first modulating optical system 30 are incident on the polarizing beam splitter 51 as P-polarized light. Therefore, the laser beams emerged from the first modulating optical system 30 pass through the polarizing beam splitter 51.

Like the first modulating optical system 30, the second modulating optical system 40 is provided with a first relay lens system 43, a piezo mirror 44, a second relay lens system 45, the diffractive beam-dividing element 41, a condenser lens 46, the multichannel AOM 42, a mirror 47, a collimator lens 48 and a half-wave plate 49, arranged in this order from the mirror 23.

The second monochromatic beam reflected by the mirror 23 is adjusted in its diameter by the first and second relay lens systems 43 and 45, and the adjusted beam is incident on the diffractive beam-dividing element 41 as a parallel beam. The incident beam is divided into a plurality of beams that emerge at different diffraction angles. The separate beams are condensed by the condenser lens 46 on the channels of the multichannel AOM 42 to be modulated. The channels are substantially located in the rear focal plane of the condenser lens 46.

The modulated divergent beams are reflected by the mirror 47 and collimated by the collimator lens 48 to be incident on the polarizing beam splitter 51 as S-polarized light through the half-wave plate 49. Therefore, the laser beams emerged from the second modulating optical system 40 are reflected by the polarizing beam splitter 51.

The polarizing beam splitter 51 allows the laser beams emerged from the first modulating optical system 30 to pass therethrough and reflects the laser beams emerged from the second modulating optical system 40 so as to combine all of the laser beams. The combined laser beams are simultaneously deflected by the polygon mirror 61 to form the beam spots on the object surface S through the fθ lens 71.

The laser beams of the first wavelength form a plurality of beam spots, which are arranged at a predetermined pitch, on the object surface S through the first modulating optical system 30. Similarly, the laser beams of the second wavelength form a plurality of beam spots, which are arranged at the same pitch as for the beam spots of the first wavelength, on the object surface S through the second modulating optical system 40. In this example, the beam spots formed by the laser beams of the first wavelength and the beam spots of the second wavelength are separated on the object surface S. The beam spots of the respective wavelengths are arranged alternately along the straight line that is angled with respect to both of the main and auxiliary scanning directions.

Hereafter, the relationship among scan efficiency, resolution and the arrangement of the beam spots will be described.

In order to increase the plotting speed, it is desirable to increase the scan efficiency. The scan efficiency is defined as the ratio of the active scan time over the total scan time. In the multiple beam scanning optical system, since the beam spots on the object surface are separated in the main scanning direction, the shorter the distance between the most outside beam spots in the main scanning direction is, the larger the scan efficiency is. Since the distance becomes larger as the angle of the straight line, along which the beam spots are arranged, with respect to the auxiliary scanning direction increases, it is desirable that the angle becomes as small as possible.

On the other hand, a pitch of scanning lines in the auxiliary scanning direction should be small to increase the resolution in the auxiliary scanning direction. There are two ways to reduce the pitch of scanning lines. The first way is to increase the angle of the straight line with respect to the auxiliary scanning direction, and the second way is to reduce a pitch of the beam spots along the straight line. Since the first way contradicts the requirement of the high scan efficiency, it is preferable to select the second way.

Since the channels of the AOM are optically conjugate with the object surface, the pitch of the beam spots along the straight line becomes small as the pitch of the channels decreases. However, the downsizing of the AOM creates manufacturing difficulty, which increases a cost.

Therefore, when the scanning optical system employs a plurality of modulating optical systems, they are preferably arranged such that the beam spots of the respective wavelengths are arranged alternately along the straight line, in order to increase the resolution in the auxiliary scanning direction while keeping a high scan efficiency and low cost.

The first and second modulating optical systems 30 and 40 are optimized for the respective wavelengths such that the beam spots of the respective wavelengths are formed at the identical pitches.

Next, the design examples of the first and second modulating optical systems 30 and 40 to form the beam spots at the identical pitches will be described.

Since the channels of the multichannel AOM's 32 and 42 are optically conjugate to the object surface S, when the pitches of the convergent points on the respective AOM's 32 and 42 are identical, the pitches of the beam spots on the object surface S will be identical. There are two ways to keep the identical pitches of the beam spots of the respective wavelengths.

In the first way, the relationship among the grating pitches of the diffractive beam-dividing elements 31 and 41 are determined such that the grating pitch is proportional to the wavelength as shown in TABLE 1, for example. In the first way, the focal lengths of the condenser lenses 36 and 46 are identical.

In TABLE 1, $\lambda$ denotes the wavelength, dp denotes the grating pitch of the diffractive beam-dividing element, da denotes an angular pitch of the emergent beams diffracted by the diffractive beam-dividing element, fc is a focal length of the condenser lens, and bp denotes the pitch of the convergent points on the multichannel AOM.

TABLE 1

| Modulating optical system | $\lambda$ (nm) | dp ($\mu$m) | da (rad.) | fc (mm) | bp (mm) |
|---|---|---|---|---|---|
| First system 30 | 363.8 | 29.10 | 0.01250 | 120.00 | 1.5 |
| Second system 40 | 351.1 | 28.09 | 0.01250 | 120.00 | 1.5 |

In the second way, the relationship among the focal lengths of the condenser lenses 36 and 46 are determined such that the focal length is inversely proportional to the wavelength as shown in TABLE 2, for example. In the second way, the grating pitches are identical.

TABLE 2

| Modulating optical system | $\lambda$ (nm) | dp ($\mu$m) | da (rad.) | fc (mm) | bp (mm) |
|---|---|---|---|---|---|
| First system 30 | 363.8 | 29.10 | 0.01250 | 120.00 | 1.5 |
| Second system 40 | 351.1 | 29.10 | 0.01206 | 124.34 | 1.5 |

In any way, the convergent points are arranged on the multichannel AOM in the identical pitches, which allows to arrange the beam spots on the object surface S in the identical pitches.

Further, when the beams diffracted by the multichannel AOM are used as the plotting beams, frequency of the ultrasonic waves applied to the AOM 32 is set to be different from that to the AOM 42 such that the pitches of the beam spots formed by the respective monochromatic beams are identical to each other.

The diffraction angle $\theta$ (rad.) is defined by the following equation.

$$\theta = \lambda \cdot f / v, \quad (1)$$

where f denotes the frequency (Hz) of the ultrasonic wave, v denotes the propagation speed (m/s) of the ultrasonic wave and $\lambda$ denotes the wavelength of the incident beam (nm).

Therefore, if the frequencies applied to the multichannel AOM's 32 and 42 are identical, the incident angles of the respective monochromatic beams onto the object surface S become different. Since the AOM is optically conjugate with the object surface S, the beam spots are formed at the identical pitches. However, when field curvature of the f$\theta$ lens 71 or mechanical error causes a partial out-focus area, the beam spot pitches will be confused in the out-focus area. Therefore, in the embodiment, the frequency f of the ultrasonic wave is set to be inversely proportional to the wavelength in order to keep the constant diffraction angle $\theta$.

As described above, since the laser optical system of the present invention is provided with a plurality of modulating optical systems corresponding to the respective wavelengths, each modulating optical system treats a monochromatic beam. Accordingly, chromatic aberration due to the wavelength dependence of the diffractive elements presents no problem. As a result, the laser optical system can use a plurality of peak wavelengths as many as the number of the modulating optical systems employed, which increases the energy efficiency.

The present disclosure relates to the subject matter contained in Japanese Patent Application No. HEI 11-196439, filed on Jul. 9, 1999, which is expressly incorporated herein by reference in its entirety.

What is claimed is:

1. A laser optical system for forming at least one beam spot on an object surface to be exposed, said laser optical system comprising:
   a multiline laser source that emits a laser beam having a plurality of peak wavelengths;
   a wavelength separating element that separates the laser beam emitted from said multiline laser source into a plurality of monochromatic beams;
   a plurality of modulating optical systems that modulate intensities of said respective monochromatic beams by a modulator, each of said modulating optical systems including a diffractive element; and
   a beam combining optical system that combines said monochromatic beams modulated by said modulating optical systems.

2. The laser optical system according to claim 1, wherein said beam combining optical system combines said modulated laser beams such that the combined laser beams form separate beam spots on said object surface.

3. The laser optical system according to claim 1, wherein said modulator comprises an acoustooptic modulator that changes a direction of an emergent beam by diffraction caused by an input ultrasonic wave, one of a diffracted beam and a non-diffracted beam emerges from said modulator as a modulated beam to form said beam spot.

4. The laser optical system according to claim 3, wherein the diffracted beam emerges from said acoustooptic modulator as said modulated beam, and wherein the frequencies of said input ultrasonic wave are determined based on the wavelengths of said respective monochromatic beams such that the frequency is inversely proportional to the wavelength.

5. The laser optical system according to claim 1, wherein each of said modulating optical systems includes:
   a diffractive beam-dividing element as said diffractive element that divides each of said monochromatic beams into a plurality of separate beams, a multichannel modulator that independently modulates each of the beams separated by said diffractive beam-dividing element, and a condenser lens located between said diffractive beam-dividing element and said multichannel modulator to condense said separate beams on the channels of said multichannel modulator.

6. The laser optical system according to claim 5, wherein the grating pitches of said diffractive beam-dividing elements are determined based on the wavelengths of said respective monochromatic beams such that the grating pitch is proportional to the wavelength, while keeping identical focal lengths of said condenser lenses, such that divided monochromatic beams form beam spots at the identical pitches on said object surface.

7. The laser optical system according to claim 5, wherein focal lengths of said condenser lenses are determined based on the wavelengths of said respective monochromatic beams such that the focal length is inversely proportional to the wavelength, while keeping identical grating pitches of said diffractive beam-dividing elements, such that the divided monochromatic beams form beam spots at the identical pitches on said object surface.

8. The laser optical system according to claim 7, wherein said beam combining optical system includes a polarizing beam splitter, and wherein the laser beam modulated by one of said modulating optical system is incident on said polarizing beam splitter as S-polarized light and the laser beam modulated by the other modulating optical system is incident on said polarizing beam splitter as P-polarized light.

9. The laser optical system according to claim 8, wherein said beam combining optical system includes a polarizing beam splitter, and wherein the laser beam modulated by one of said modulating optical system is incident on said polarizing beam splitter as S-polarized light and the laser beam modulated by the other modulating optical system is incident on said polarizing beam splitter as P-polarized light.

10. The laser optical system according to claim 1, further comprising a deflector that deflects a plurality of laser beams combined by said beam combining optical system, and a converging optical system that converges said laser beam deflected by said deflector to form beam spots on said object surface.

* * * * *